(12) United States Patent
Rekuc et al.

(10) Patent No.: US 9,104,377 B2
(45) Date of Patent: Aug. 11, 2015

(54) RETRACTOR CORD ASSEMBLIES FOR CARRIED ARTICLES

(71) Applicants: Richard J. Rekuc, Asbury, NJ (US); Steven J. Rekuc, Avon, CO (US); David Edward Ringel, Quakertown, PA (US)

(72) Inventors: Richard J. Rekuc, Asbury, NJ (US); Steven J. Rekuc, Avon, CO (US); David Edward Ringel, Quakertown, PA (US)

( * ) Notice: Subject to any disclaimer, the term of this patent is extended or adjusted under 35 U.S.C. 154(b) by 0 days.

(21) Appl. No.: 14/216,114

(22) Filed: Mar. 17, 2014

(65) Prior Publication Data

US 2014/0198442 A1 Jul. 17, 2014

Related U.S. Application Data

(63) Continuation of application No. PCT/US2012/063817, filed on Nov. 7, 2012.

(60) Provisional application No. 61/628,796, filed on Nov. 7, 2011, provisional application No. 61/741,973, filed on Aug. 1, 2012.

(51) Int. Cl.
| | |
|---|---|
| A45F 5/00 | (2006.01) |
| A45F 3/02 | (2006.01) |
| G06F 1/16 | (2006.01) |
| A45C 13/26 | (2006.01) |
| A45C 13/30 | (2006.01) |
| B65H 75/36 | (2006.01) |
| A45F 3/14 | (2006.01) |

(52) U.S. Cl.
CPC .............. *G06F 1/1662* (2013.01); *A45C 13/26* (2013.01); *A45C 13/30* (2013.01); *A45F 3/02* (2013.01); *A45F 5/004* (2013.01); *A45F 2003/142* (2013.01); *A45F 2200/0525* (2013.01); *B65H 75/368* (2013.01); *G06F 1/1628* (2013.01)

(58) Field of Classification Search
USPC .......................... 224/578, 579, 162; 150/108; 361/679.59; 242/388, 388.6, 400.1, 242/388.91
See application file for complete search history.

(56) References Cited

U.S. PATENT DOCUMENTS

| | | | | |
|---|---|---|---|---|
| 2,009,192 | A * | 7/1935 | Freysinger | 383/14 |
| 2,769,475 | A * | 11/1956 | Fisher | 190/115 |
| 4,760,622 | A * | 8/1988 | Rohrman | 16/196 |
| 4,763,763 | A * | 8/1988 | Sadow | 190/115 |
| 4,887,751 | A * | 12/1989 | Lehman | 224/579 |
| 5,005,868 | A * | 4/1991 | Stern et al. | 280/814 |
| 5,027,874 | A * | 7/1991 | Gazzola | 150/108 |
| 5,119,910 | A * | 6/1992 | Heggeland | 190/116 |
| 5,881,932 | A * | 3/1999 | Wadden | 224/153 |
| 5,897,039 | A * | 4/1999 | Swenke | 224/162 |
| 6,053,381 | A * | 4/2000 | Fahl et al. | 224/153 |
| 6,536,078 | B2 * | 3/2003 | Tsai | 16/114.1 |

(Continued)

*Primary Examiner* — Justin Larson
(74) *Attorney, Agent, or Firm* — Ober, Kaler, Grimes & Shriver; Royal W. Craig

(57) ABSTRACT

A low-profile retractable cord system in which a line is attached to a pair of retractor mechanisms located in the sides of an article to be carried (such as a briefcase, a purse, a handbag, suitcase, tote, bag, knapsack, sports bag, gym bag, etc.). The line is high-tensile braided line threaded out through eyelets which are offset inwardly and downwardly from the upper corners of the article to be carried. This way, the line and shoulder pad attached thereto lie flat along the carried article. Various retractor mechanisms are shown, including an opposed pair of coil-spring-biased reels, opposed independent pulley mechanisms, or a common pulley mechanism. An alternate embodiment employs a single retractor mechanism and line for a single loop-handle is also shown.

11 Claims, 9 Drawing Sheets

(56) References Cited

U.S. PATENT DOCUMENTS

| | | | |
|---|---|---|---|
| 7,610,944 B2 * | 11/2009 | Reiter | 150/107 |
| 7,936,562 B2 * | 5/2011 | Nagamura et al. | 361/679.59 |
| 8,015,669 B2 * | 9/2011 | Huang et al. | 16/405 |
| 8,123,092 B2 * | 2/2012 | Krulik et al. | 224/578 |
| D683,731 S * | 6/2013 | Chiu et al. | D14/345 |
| 8,477,493 B2 * | 7/2013 | Wu et al. | 361/679.56 |
| 8,607,976 B2 * | 12/2013 | Wu et al. | 206/320 |
| 2003/0034370 A1 * | 2/2003 | Gibson | 224/609 |
| 2004/0188289 A1 * | 9/2004 | Woo | 206/320 |
| 2006/0273211 A1 * | 12/2006 | Langberg et al. | 242/388.91 |
| 2007/0193902 A1 * | 8/2007 | Myers et al. | 206/320 |
| 2010/0171021 A1 * | 7/2010 | Smith | 248/558 |
| 2012/0311810 A1 * | 12/2012 | Gilbert et al. | 15/320 |
| 2013/0001107 A1 * | 1/2013 | Armstrong | 206/216 |

* cited by examiner

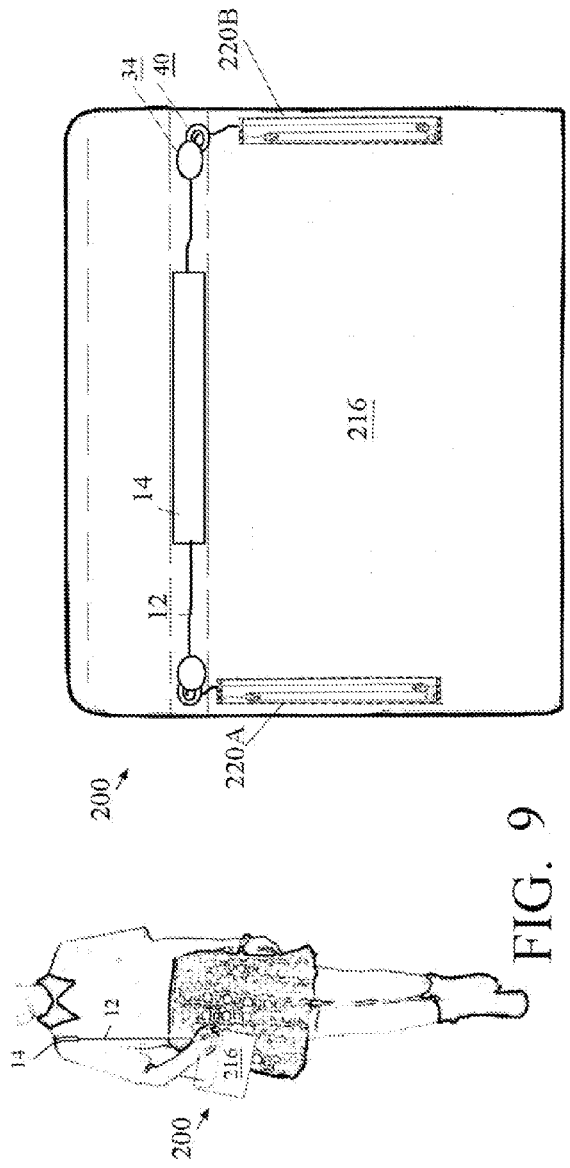
FIG. 9
FIG. 10
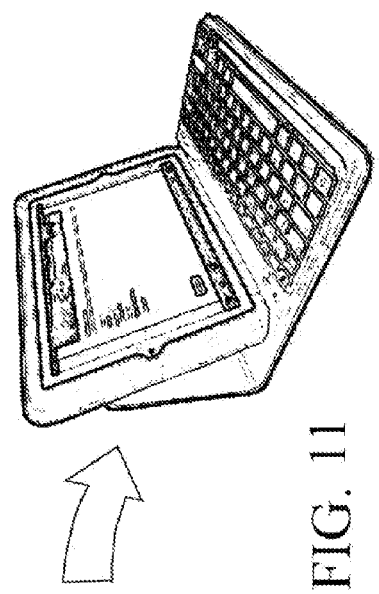
FIG. 11
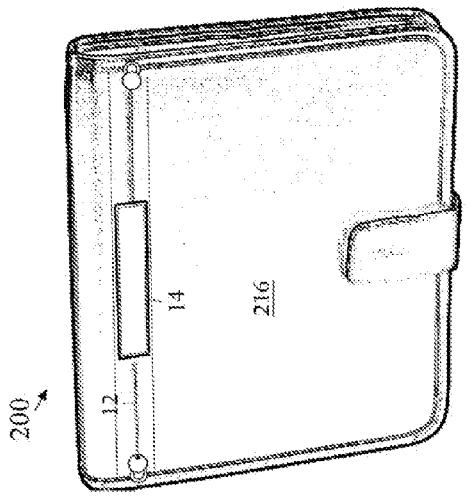

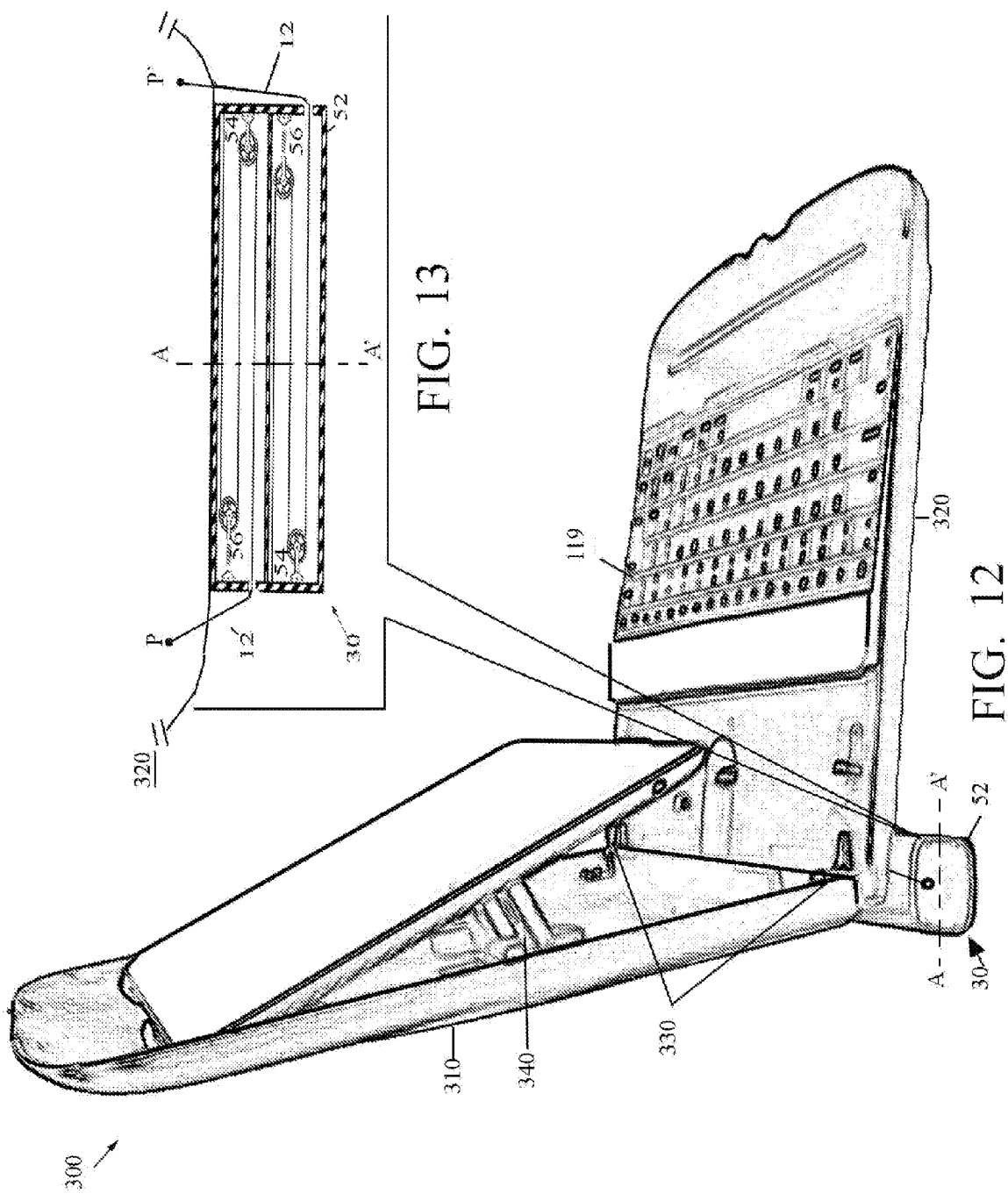

RETRACTOR CORD ASSEMBLIES FOR CARRIED ARTICLES

CROSS-REFERENCE TO RELATED APPLICATION(S)

The present application is a continuation of International (PCT) Application No. PCT/US12/063,817 filed 7 Nov. 2012 (Publication No. WO2013070671), which in turn derives priority from U.S. Provisional Patent Application No. 61/628,796 filed Nov. 7, 2011 and 61/741,973 filed Aug. 1, 2012.

BACKGROUND OF THE INVENTION

1. Field of the Invention

The present invention relates to improvements in carrying straps and handles for bags, briefcases, computer sleeves, portfolios, handbags, business cases, attaches, purses, covers for electronic devices such as smart phones, tablet computers, GPS systems, eBook readers, and other carried articles, and more particularly to a low-profile retractable shoulder cord or handle system with improved retractor mechanism.

2. Description of the Background

Shoulder straps and hand straps are commonly attached to handbags, portfolios, briefcases and the like to make carrying easier. Such straps allow a user to transport the carried article without hands. Most shoulder straps comprise a strap with shoulder pad that helps keep the shoulder strap from slipping off the shoulder while in use. The shoulder pad also serves as padding to spread the pressure of the weight of the bag, thus avoiding creating a focal point of pressure. This greatly increases comfort for the user.

Despite their advantages shoulder straps can create problems. When the bag is not being transported the strap is left to dangle, or lie on the floor making it unsightly. This can create a danger of someone tripping and falling. For example, loose shoulder straps protruding from under airplane seats catch many unsuspecting passengers. Loosely dangling shoulder straps and handles are also cumbersome, unsightly and unsanitary. While not in use, the straps lie on the floor and will pick up dirt and dust. The dirt is likely to be transferred to the shoulder of the user.

The constant transporting of bags and cases presents many opportunities for dangling straps to present dangers, unless the straps are protected in some manner with a covering or containment.

The concept of a retractable strap or handle is well-established in the prior art. For example, U.S. Pat. No. 8,123,092 by Krulik et al. shows a retractable shoulder strap for carrying cases such as luggage, suitcases, or briefcases. The strap feeds through a slider yoke, and the yoke is connected to the carry case by a plurality of extension springs.

U.S. Pat. No. 1,979,978 to Martin discloses a hand bag having a pair of carrying handles and a resilient device connecting each end of each handle to the body of the receptacle, the resilient device comprising a coiled compression spring disposed within the receptacle.

French Patent No. FR1028376 to Grard discloses a briefcase having a coil-retractor mounted externally at each top corner for retracting a shoulder strap.

U.S. Pat. No. 3,198,300 to G. K. Tuttle et al. shows a handle having a retractable strap in which a cord is attached to a pair of retractor mechanisms located within each side of a sports bag and the outlets for the cord are in a position whereas the cord will retract back so that the cord and any padding attached thereto will lie flat against the bag. The retractor mechanism is a spool on each side with a torsion-spring-biased axle or reels to which the cord is attached. U.S. Pat. No. 3,982,613 to Wood issued Sep. 28, 1976 shows a retractable pull strap on wheeled luggage in which a single cord feeds through an inlet to a casing with a spring wound spool is mounted in the luggage adjacent the inlet.

U.S. Pat. No. 8,015,669 to Huang et al. issued Sep. 13, 2011 shows a handle for a laptop/tablet with a hidden belt that uses torsion springs to draw the belt into the handle. Thus, a user can carry the portable device with the handle, and also shoulder or hang the portable device with the hidden belt.

The structural and operational details of the above-described retractable strap systems leave room for improvement in several respects. Extraction of the strap may be unduly difficult, requiring two hands (one to secure the article to be carried and one to pull the strap portion out). The foregoing retraction mechanisms are susceptible to friction and tangling. The need for both hands and the difficult degrade the utility of the strap. Moreover, upon retraction the straps and shoulder pads do not stow anywhere and remain exposed, obtrusive and susceptible to tangling. Such straps can create other issues that are not addressed by conventional means. When the bag is not being transported, the straps are left to bulge or dangle, possibly creating a danger of tripping.

Therefore, a need exists for a tightening system that pulls in line with the strap direction, is easy to adjust with one hand, achieves a mechanical advantage for secure tightening, and seats flush and securely in place all on its own. The present invention meets these needs as discussed below.

Specifically, it is desirable to provide a retractor mechanism having a calibrated spring bias slightly less than the weight of the article to be carried. The retractor mechanism should also be extremely smooth, tangle and friction-free so that when a user raises the shoulder pad/handle the weight of the article to be carried overcomes the spring bias and the line extends smoothly and equally from both sides of the article to be carried.

SUMMARY OF THE INVENTION

It is therefore, an object of the invention to provide a retractable shoulder cord for a carried article the length of which can be instantly extended or retracted for carrying the article on the shoulder.

It is another object to provide an alternative to webbing, e.g., to use microfine cord instead of flat webbing, and a retraction mechanism specifically for cord not webbing, based on a series of pulleys located within a small mechanism that includes a yoke.

Another object of the present invention is to provide an extremely low-profile retractable shoulder cord which is completely non-intrusive, comfortable and easy to carry, and easily put on and remove from the user's shoulder with a single hand and without any locking device.

Still another object of the present invention is to provide a tablet case and/or portfolio with an instantly retractable shoulder cord is counterbalanced against the load such that the tablet case/portfolio suspends at any chosen level.

In accordance with the foregoing object, the present invention is a low-profile retractable cord system, and a case such as a tablet case and/or portfolio incorporating the retractable cord system.

A cord is attached to a pair of retractor mechanisms located within each side of an article to be carried (such as a briefcase, a purse, a handbag, suitcase, tote, bag, knapsack, sports bag, gym bag, etc.). The cord is high-tensile braided cord, and the outlets for the cord are in an offset position so that the cord and shoulder padding attached thereto lies flat along the spline of the carried article.

An alternate embodiment suitable for use in a smartphone case employs a single retractor mechanism and cord for a single loop-handle. When the user of the case wishes, he can easily pull the cord with minimal force, or just hold the cord in the center of the cord that is outside the case, or by the shoulder pad and the weight of the case with the contents is sufficient to pull additional cord out of the retractor to create a shoulder harness.

Various rectractor mechanisms are shown, including an opposed pair of coil-spring-biased reels, opposed independent pulley mechanisms, or a common pulley mechanism.

BRIEF DESCRIPTION OF THE DRAWINGS

Other objects, features, and advantages of the present invention will become more apparent from the following detailed description of the preferred embodiments and certain modifications thereof when taken together with the accompanying drawings in which:

FIG. 9 is a perspective view of a tablet case 200 with retractable cord system according to another embodiment of the present invention.

FIG. 10 is a front cross-section of the retractable cord tablet case 200 of FIG. 9.

FIG. 11 is a composite drawing including a front view of the retractable cord tablet case 200 of FIGS. 9-10 and a perspective view of the deployed tablet case 216 holding a tablet.

FIG. 12 is a perspective view of a hard shell tablet case 300 with retractable cord system according to another embodiment of the present invention.

FIG. 13 is a cross-section along line A-A' as shown in FIG. 12.

DETAILED DESCRIPTION OF THE PREFERRED EMBODIMENT

Wherever possible, the same reference numbers will be used throughout the drawings to refer to the same or like parts. The present invention is a retractable cord system for purses, handbags, computer sleeves, portfolios, protective cases, business cases, or other bags or cases (collectively "carried article").

Figure 1:
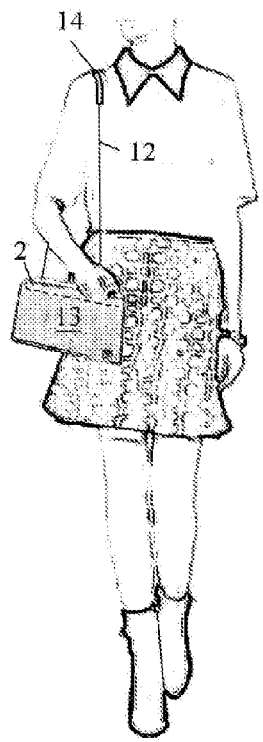
FIG. 1 is a perspective view of the retractable cord system 2 according to an embodiment of the present invention incorporated in a tablet case 13.

As seen in FIG. 1 the retractable cord system 2 employs a small thin "low-profile" shoulder pad 14 formed as a rectangular strip approximately 2-3 mm thick and attached centrally to a length of microfine high-strength braided line 12 of generally circular cross-section. Specifically, line 12 is preferably braided microfiber line comprising wound polymer filaments braided into a generally circular cross section. Ultra high molecular weight polyethylene filaments (UHMWPE) are preferred, and micro-dyneema line 12 (braided UHMWPE) of 50-100 lb test, within a range of from 0.5 mm to 4 mm, and most preferably about 1.524 mm is well-suited. The selected line should be at least 50 lb test, though actual breaking strength commonly exceeds pound-test rating. The advantage of this particular line 12 is its microfine circularly-braided cross-section which provides distinct anti-twisting, low friction and abrasion-resistant properties. However, one skilled in the art should recognize that polymer monofilament will also suffice, provided it too is 50-100 lb test and within a range of from 0.5 mm to 4 mm diameter, inasmuch as monofilament has a smooth low-friction circular cross-section. A key design consideration for microfine line 12 is to reduce heat build-up and fraying at its contact surfaces, and the combination of circular cross-section, and microfine synthetic low-friction filaments helps accomplish this.

The retractable cord system 2 of FIG. 1 is incorporated in a tablet case 13 for carrying and protecting a tablet computer.

Figure 2:
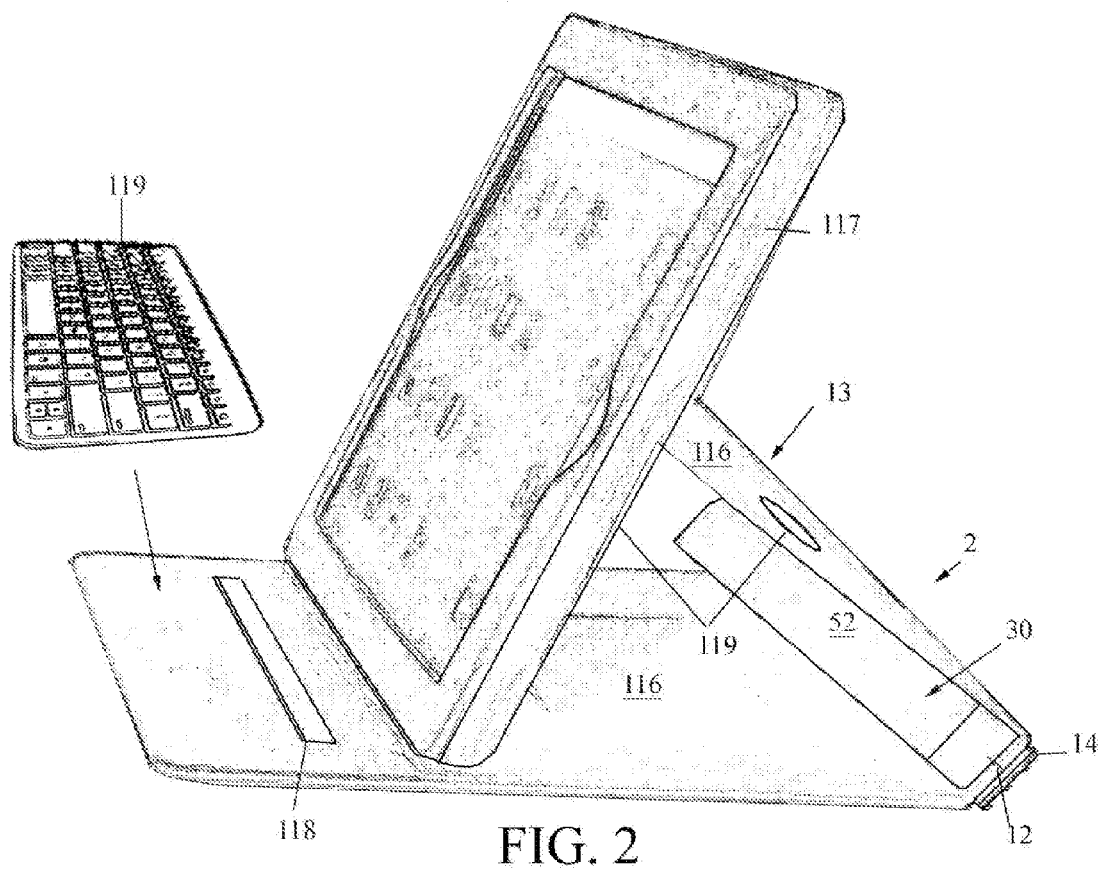
FIG. 2 is an exploded perspective view of the tablet case 13 of FIG. 1 with retractable cord system 2.
Figure 3:
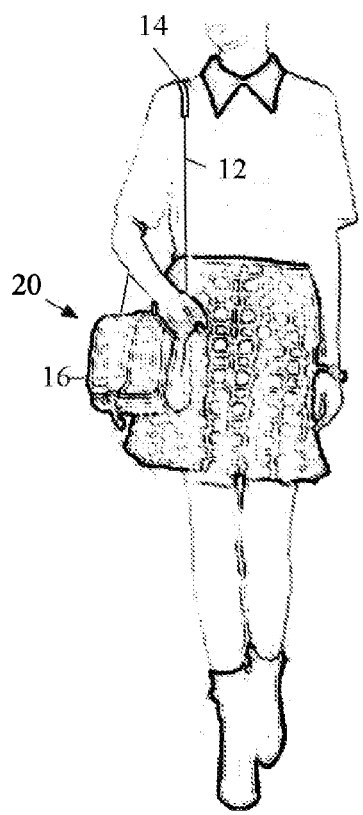
FIG. 3 is a perspective view of the retractable cord system 20 according to another embodiment of the present invention incorporated in a portfolio 16.

FIG. 2 is an enlarged perspective view of the tablet case 13. As seen in FIG. 2 the line 12 (dotted lines) extends from each opposing end of shoulder pad 14, traverses an aperture in the spline of tablet case 13, and enters a dual-pulley retractor 30 mechanism (described below with regard to FIG. 5) according to an embodiment of the invention. The dual-pulley retractor 30 mechanism is housed in an elongate rectangular housing that runs along the length of the spline internal to the tablet case 13, and includes two independent spring-biased retractor mechanisms (described below) portfolio. The opposing retractor mechanisms each have a spring bias calibrated within a range of from 40-509% of the weight of the article to be carried, here tablet case 13 plus tablet portfolio (1-20 Newtons). This is important to single-handed operation inasmuch as it ensures that when the user extends the shoulder pad 14 the weight of the portfolio tablet and case 13 counterbalances the spring bias of the two retractors. The user simply (and single-handedly) positions the tablet case 13 at the desired height (such as shown in FIG. 1) and the counterbalanced retractor keeps the case 13 suspended at that height. FIG. 3 is a perspective view of the retractable cord system 20 according to another embodiment of the present invention incorporated in a portfolio 16, and FIG. 4 is a front cross-section of the portfolio 16 of FIG. 3 with retractable cord system 20.

Figure 4:
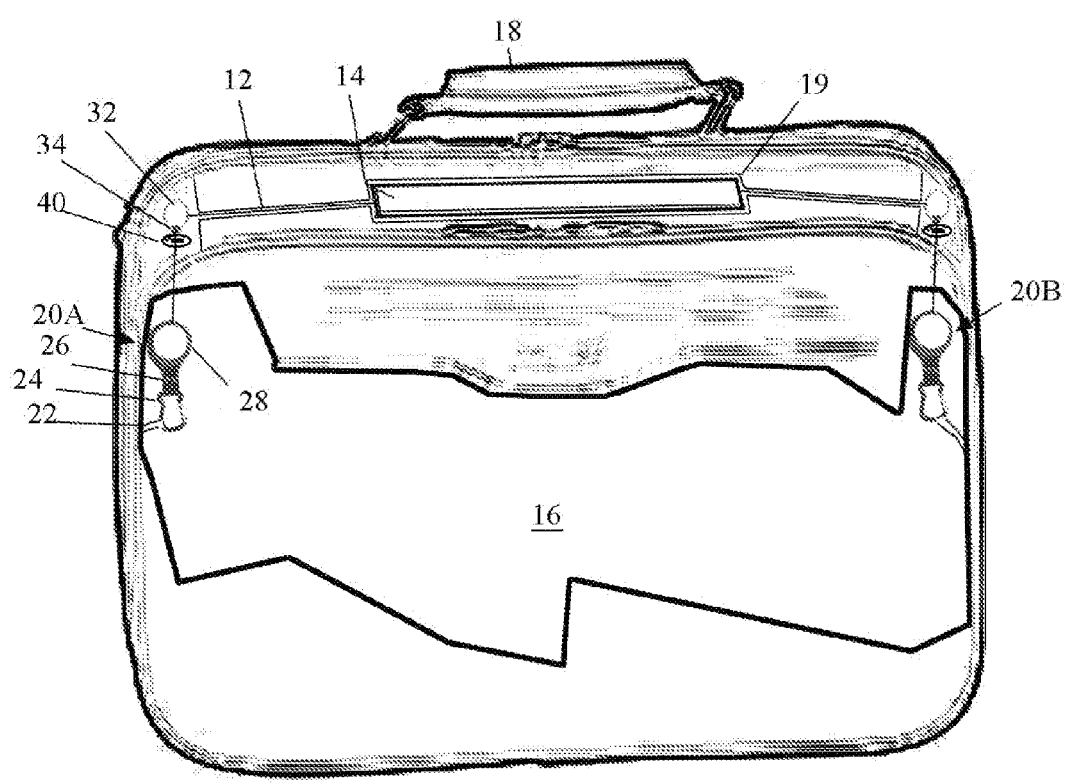
FIG. 4 is a front cross-section of the portfolio 16 of FIG. 1 with retractable cord system 20.

As seen in FIG. 4 the line 12 is here spooled into two opposing spring-biased retractor mechanisms 20A, 20B attached on opposing inside edges of the portfolio 16. As above, the opposing retractor mechanisms 20A. 20B each have a spring bias calibrated within a range of from 40-49% of the weight of the article to be carried for single-handed counterbalanced operation. With the shoulder pad 14 over the shoulder the user pushes the portfolio 16 down to the desired height, the line 12 freely extends equally from both mechanisms 20A, 20. The weight of the portfolio 16 counterbalances the spring bias of the two retractors 20A, 20B, and the portfolio 16 remains suspended at that height.

Each retractor mechanism 20A, 20B further comprises a spring-wound spool inside a molded disk-shaped housing 28, and attachment loop 26 secured thereto. An anchor such as a mini-carabiner 24 is secured on the loop 26, and the carabiner 24 is removably secured to a loop sewn into the portfolio 16 midway up on each side, offset from the centerline toward the front. The line 12 is spooled up through eyelets 40 at the right front corner of the portfolio 16. The line 12 is secured at each eyelet 40 by a line-stop 34 such as a bead clamped onto the line 12, the line stop 34 being slightly larger than the eyelet 40 hole to prevent over-retraction. The illustrated line 12 is interrupted at line stop 34 to allow removal of the shoulder pad 14, and this is accomplished with a bead 34 having a through-hole in which a small key-ring loop 32 is inserted. A second length of line 12 joins the two loops 32 and this passes through the shoulder pad 14 s will be described.

In certain embodiments (such as FIGS. 3-4) at least the shoulder pad 14, and more preferably both line 12 and pad 14 are recessed and seated in a form-fitting recess molded or formed in the top of the portfolio 16. The illustrated recess of FIG. 4 comprises an elongate rectangle aligned along a recessed groove running from eyelet 40 to eyelet 40 for recessing line 12. This ensures that the line 12 and shoulder pad 14 remain protected to avoid catching and tangling. The recess is preferably offset from the centerline of portfolio 16 and handle 18 to ensure self-stowage in an unobtrusive location. In other embodiments (FIGS. 1-2) the shoulder pad 14 occupies the entire area of the spline of the tablet case 13, line 12 passing directly from shoulder pad 14 through the spline into case 13, so that the shoulder pad 14 slightly elevates the spline, likewise ensuring that the line 12 and shoulder pad 14 remain protected to avoid catching and tangling. In the embodiment of FIG. 4 each spring-wound spool 28 comprises a take-up reel rotatably journaled inside a casing, and a helical coil spring engaged to the reel to counter-bias it against rotation, thereby keeping the line 12 wound about the spool. There are a variety of commercially-available spring-wound spools that may suffice, an example of which is set forth in U.S. Pat. No. 7,172,150 to Hutchison, II, et al. issued Feb. 6, 2007. One of the objects of the present invention is to provide a calibrated retraction force and this can be difficult with a commercially-available spring-wound rotary spool 28 type retractor mechanism 20. Thus, the present invention also contemplates use of a variety of alternative pulley-type retractor mechanisms.

Figure 5:
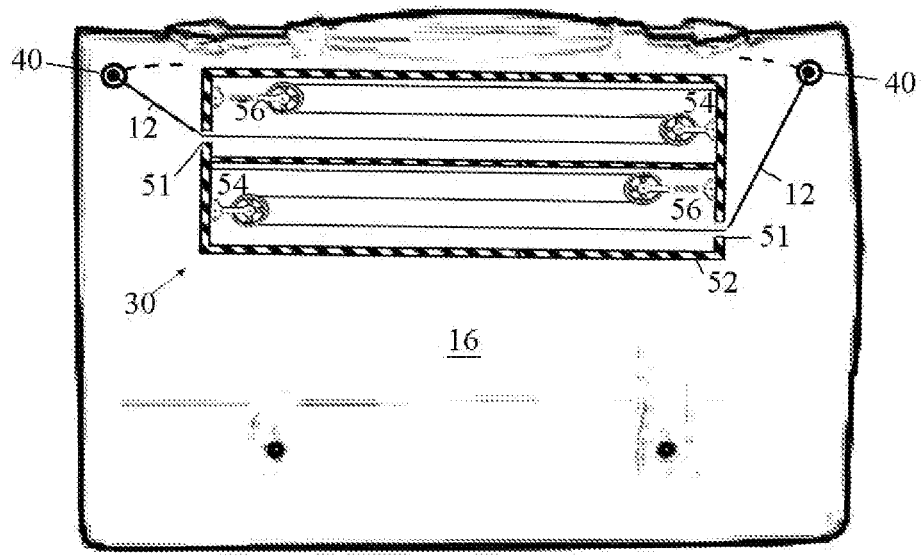
FIG. 5 is a front cross-section of a retractable cord system incorporating a single dual-pulley retractor 30 mechanism according to an embodiment of the invention.

FIG. 5 is a side cross-section of a dual-pulley retractor 30 mechanism according to an embodiment of the invention. The dual-pulley retractor 30 employs an elongate rectangular housing 52 which is attached inside a carried article such as the portfolio 16 of FIGS. 1-2, or inside the spline of the tablet case 13 of FIG. 2. The elongate rectangular housing 52 is partitioned into two parallel compartments. Housing 52 may be molded of plastic material such as polypropylene or acrylonitrile-butadiene styrene (i.e., ABS), and may be mounted across the mouth of portfolio 16 as shown in FIG. 5, or across the spline of the tablet case 13 of FIG. 2. Each compartment is substantially enclosed except for a pin-hole aperture 51 therein for passing the line 12. Each compartment has a fixed pulley 54 and a spring-mounted pulley 56 mounted therein in an opposed relationship as shown. In the embodiment of FIG. 4 two ends of a continuous length of line 12 are spooled through eyelets 40 at the right front corner of the portfolio 16 (or alternatively two separate lengths of line 12 are spooled up through eyelets 40 and are terminated at line stops 32 shown in FIG. 4. In the embodiment of FIG. 2 line 12 passes directly from the rear of shoulder pad 14 through eyelets 40 in the spline into the elongate rectangular housing 52. Again, two separate lengths of line 12 may be used. Referring back to FIG. 5, line 12 enters the enclosure 52 through an aperture 51 and traverses the enclosure three times, doubling back around the fixed pulley 54, then doubling back around the spring-mounted pulley 56, and finally attached to the wall of enclosure 52. The fixed pulley 54 is a pulley spool rotatably mounted on an axle held in a yoke-bracket, the bracket being fixedly attached to enclosure 52. The spring-mounted pulley 56 is a pulley spool rotatably mounted on an axle held by a yoke bracket, the bracket being mounted to enclosure 52 by an extension spring. As the line 12 is pulled out the spring-mounted pulley 56 biases outward. The dual-pulley mechanism allows the line 12 to slide smoothly into and out from the enclosure 52 and allows precise setting of the retraction force necessary to do so. As the shoulder pad 14 is released by the user it returns to the position shown in FIGS. 2 and/or 5.

Figure 6:
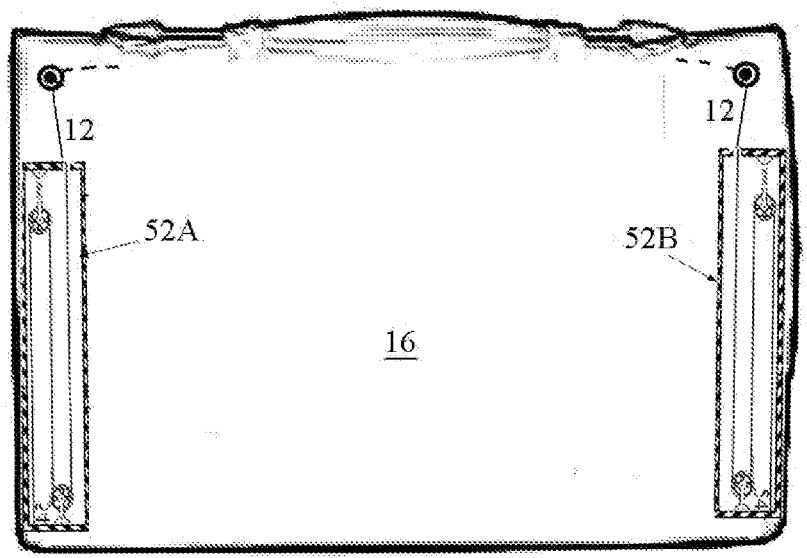
FIG. 6 is a front cross-section of a retractable cord system incorporating a bifurcated dual-pulley retractor 30 mechanism according to another embodiment of the invention.

FIG. 6 is a side cross-section illustrating how the elongate rectangular housing 52 of FIG. 5 (partitioned into two parallel compartments) can be bifurcated into two separate vertically-mounted enclosures 52A, 52B located on opposing sides of the portfolio 16.

Figure 7:
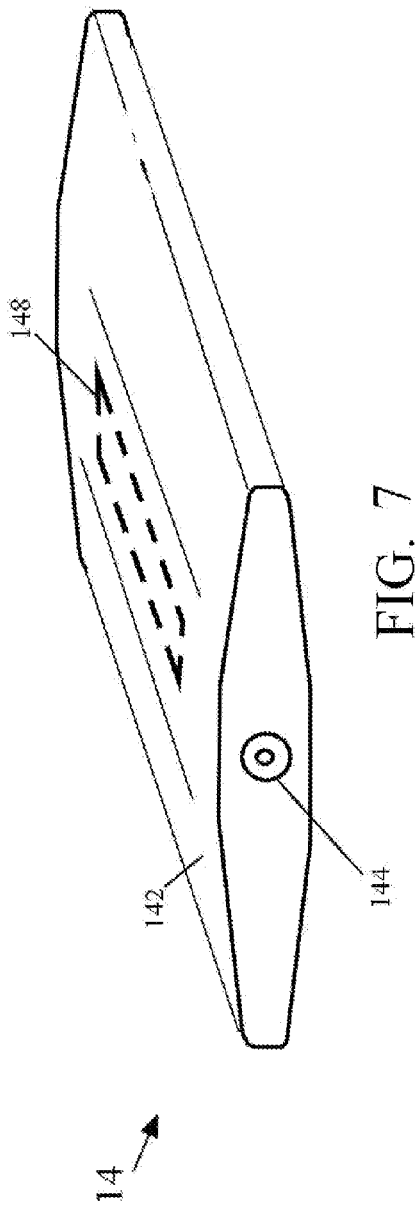
FIG. 7 is a side view of the low-profile shoulder pad 14 of the present invention.

FIG. 7 is a side view of the shoulder pad 14, which comprises a slim low-profile pad formed in an approximately 8"×2"×0.25" rectangular strip. Importantly, the pad 14 is fully symmetrical so that opposing surfaces are uniformly shaped, and free to rotate about line 12 so that either surface of the pad 14 can be worn against the shoulder. Pad 14 may be formed from a rubberized plastic member 142 and has a hard durometer plastic tubule 144 embedded therein, traversing the softer rubberized member 142 lengthwise. The tubule 144 is defined by a central channel and effectively serves as a bearing surface for passing the line 12 through the foam member 142 and distributing the load.

Preferably, one or more magnetic member(s) 148 is/are embedded in the rubberized member 142 along the top surface, bottom surface, or both, and a corresponding magnetic member is embedded or otherwise attached to the article to be carried to help center and maintain the shoulder pad 14 in its receiving recess of portfolio 16 or aligned with the spline of tablet case 13. At least one of the magnetic members must be magnetized, and this is best accomplished with a magnetic member 148 formed of a section of isotropic rubberized magnetic sheet. The other magnetic member is preferably a steel stud secured to portfolio 16 or tablet case 13, but may be a contra-magnetized sheet or other magnetically-attractive material. The shoulder pad 14 may have bumps, grooves or ribbing on one or both sides to enhance the ability of the shoulder pad to stay on to the user's shoulder area and not slide down.

Figure 8:
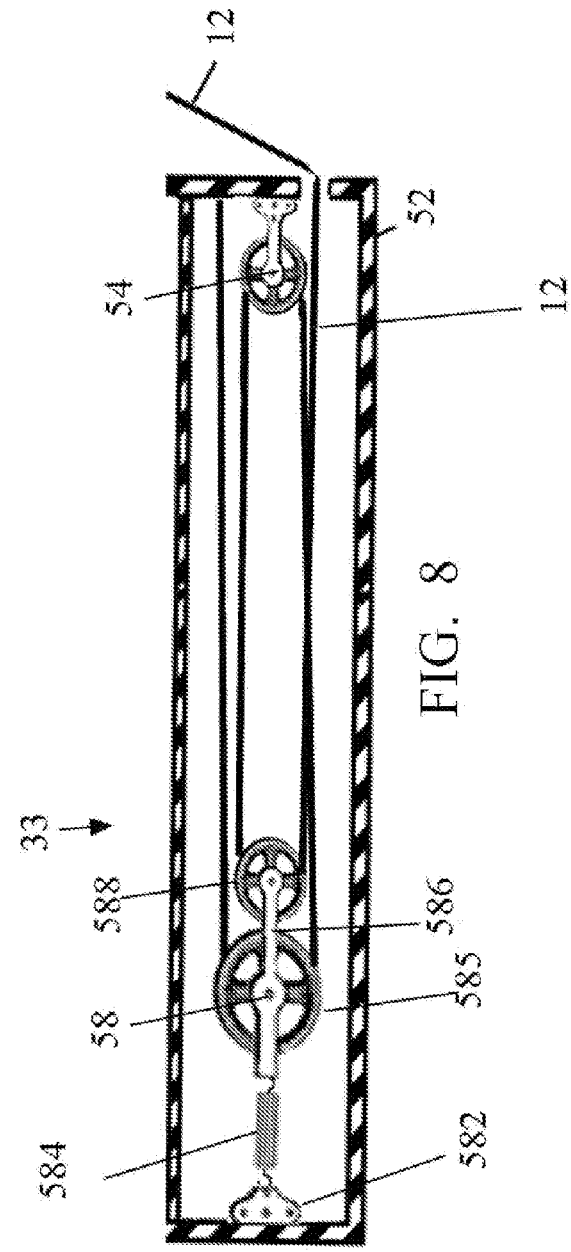
FIG. 8 is a side cross-section of another single retractor 33 mechanism according to an embodiment of the invention.

FIG. 8 is a side cross-section of another tandem-pulley retractor 33 mechanism according to an embodiment of the invention. As above, an enclosure 52 molded of plastic material has a fixed pulley 54 and a spring-mounted pulley 58 mounted therein in an opposed relationship. In this case the spring-mounted pulley 58 is a tandem (or double) pulley comprising a stationary bracket 582 fixedly mounted in enclosure 52, an extension spring 584 having one end anchored to bracket 582, a double-yoke bracket 586 anchored to the other end of spring 584, and two pulleys 585, 588 both rotatably mounted in double-yoke bracket 586. The two pulleys 585, 588 are offset and one 588 is smaller than the other 585. By wrapping the cord 12 first around the leading (smaller) pulley 588 then back around stationary pulley 54, then back and around the larger pulley 585, the mechanical leverage is greatly increased by the tandem pulley 58, extension spring 584 serving to impart the spring-bias needed for take-up, and the amount of cord 12 extracted/retracted with each incremental movement of spring 584 is effectively doubled over FIGS. 3-4.

Referring back to FIG. 2, an embodiment of tablet case 13 is formed as a bi-fold binder with two flaps 116 pivotally joined along a spine, and a tablet frame 117 defining an open-faced compartment for seating and affixing a tablet computing device. Tablet frame 117 is pivotally joined medially as shown to the distal edge of one flap 116. As described above, shoulder pad 14 is attached centrally to a length of microfine line 12 that is spooled through the spline into the housing 52 of retractor mechanism 30, which is attached interiorly along the spline of the tablet case 13. As described above in regard to FIG. 8, each spring of each spring-mounted pulley 58 is calibrated for a spring bias within a range of from 40-49% of the weight of the tablet case 13 and tablet combination (1-20 Newtons) so that the weight of the tablet case 13 (with tablet) barely overcomes the combined spring bias of retractor 30, and the line 12 with extend equally from both compartments 54, 56 of housing 52. The dual-pulley retractor mechanism 30 in a single inline housing 52 is well-suited for tablet case 30 and allows precise setting of the retraction force, and if desired the innermost wall of plastic housings 52 can be molded to additionally seat and retain the tablet in frame 117 between them inside. This way, when open, the tablet case 13 doubles back on itself and can be used as a table-stand for the tablet computer as seen in FIG. 2. To index the standing position of frame 117 a raised strip 118 may be formed along the interior surface of the opposing flap 116 to serve as a leaning stop for frame 117. A series of parallel strips 118 may be so formed to accommodate various selectable tilt angles. Alternatively (or additionally), a Bluetooth keyboard 119 may be mounted inside the flap 116 of tablet case 13 to provide a convenient interface with the tablet. The keyboard 119 is preferably mounted upside down and hinged along its rear edge to flap 116 at approximately the same position of the strip 118. This way, keyboard 119 remains stowed fully inside the case 13 but can be folded out rightside up for use. When folded out the innermost edge of keyboard 119 doubles as a leaning stop for frame 117. In accordance with the present invention, one or more magnetic member(s) 119 is/are embedded along the interior of the upper flap 116 and a corresponding magnetic member(s) 119 is embedded or otherwise attached to the rear of the tablet frame 117. The magnetic members 119 are important to ensure that the tablet and frame 117 remain folded flat when the tablet case 13 is being carried about the shoulder, otherwise the tablet frame 117 has a propensity to inadvertently unfold. At least one of the magnetic members 119 must be magnetized, and again this can be accomplished with a magnetic member 119 formed of a section of isotropic rubberized magnetic sheet or a disk. The other magnetic member 119 may be a steel stud secured to the backside of frame 117 or a contra-magnetized sheet/disk or other magnetically-attractive material.

FIGS. 9-11 collectively illustrate another embodiment comprising a tablet case 200 for tablet computers and the like with retractable shoulder pad 14. The tablet case 200 is formed as a bi-fold binder with two flaps 216 pivotally joined along a spine, defining an inside compartment for seating and affixing a tablet computing device. As in the foregoing embodiments, a small thin shoulder pad 14 is attached centrally to a length of microfine line 12 that is spooled into two opposing spring-wound retractor mechanisms 220 attached on opposing inside edges of the tablet case 200. Each of the two retractor mechanisms 220A, 220B are calibrated for a spring bias within a range of from 40-49% of the weight of the case/tablet combination (1-20 Newtons) so that the weight of the tablet 200 (with tablet) barely overcomes the spring bias of retractors 220A, 220B, and the line 12 with extend equally from both mechanisms 220A, 220B.

Each retractor mechanism 220A, 220B may further comprise either a spring-wound spool 28 with molded disk housing as described above in regard to FIGS. 3-4, or a single- or dual-pulley mechanism as described above in regard to FIGS. 1-2, 5 and 6. The dual-pulley retractor mechanism 220A, 220B shown is well-suited for precise setting of the retraction force, and the side-by-side plastic housings 52 can be molded to additionally seat and retain the tablet between them inside. The line 12 carries a small shoulder pad 14 and passes through opposed line-stops 34 (e.g. a beads) which are clamped onto the line 12. The line 12 continues through a pair of opposed eyelets 40, line-stops 34 preventing over-retraction. The eyelets 34 are placed at the top front or rear of the tablet 200 approximately 1-2" below the edge of flaps 216, and the shoulder pad 14 seats within a conforming recess formed in one of the tablet flaps 216. As the shoulder pad 14 is released by the user it returns to the position shown in FIG. 2. As with the embodiment of FIGS. 1-2, when open the portfolio 200 doubles back on itself and can be used as a table-stand for tablet computer as seen in FIG. 9.

FIGS. 12 and 13 are a perspective view and cross-section along line A-A', respectively, of a hard shell tablet case 300 with retractable cord system according to another embodiment of the present invention. This embodiment employs a dual-pulley retractor 30 mechanism as shown in FIG. 5 enclosed in an elongate rectangular housing 52 which is partitioned into two parallel compartments. The housing 52 and other components of the dual-pulley retractor 30 mechanism are as described above. However, the dual-pulley retractor 30 mechanism inclusive of housing 52 is unattached to the article to be carried (here a hard clam-shell tablet case 300) except via the two protruding lengths of line 12 which are fixedly attached and extend from housing 52. As above the two ends of line 12 exit the enclosure 52 through two opposing apertures on opposing ends of housing 52, and each end of line 12 is fixedly secured to hard shell tablet case 300 at anchor points P and P' which reside on the bottom shell of hard shell tablet case 300, approximately 1" inward from its distal edge. This way, the housing 52 itself serves as a carry-handle, and the internal dual-pulley mechanism allows the line 12 to slide smoothly into and from the enclosure 52 again with precise setting of the retraction force necessary to dislodge handle/housing 52. As the handle/housing 52 is released by the user it returns to the position shown in FIG. 1 abutting the bottom shell of hard shell tablet case 300. In this retracted position the carry-handle/housing 52 doubles in purpose as a tilt stand to sit the hard shell tablet case 300 down on a desk or other surface at a proper typing angle. The hard shell tablet case 300 further comprises a two-piece molded enclosure including a concave lower clam-shell portion 320 hinged to a concave upper clam-shell portion 310 at two opposed internal hinges 330. An internal bracket 340 is provided inside the upper portion 310 for removably securing a tablet computer therein as shown. The internal bracket 340 is preferably a low profile two-position tilt-mounting bracket, a variety of which are commercially available. Bracket 340 allows the lowermost edge of the tablet contained therein to be tilted outward an inch or so which moves the center of gravity inward away from the back edge. This prevents the combined tablet case 300 and tablet from tipping backward. Again, if desired an optional Bluetooth keyboard 119 may be seated in the lower clam-shell portion 320.

Figure 14:
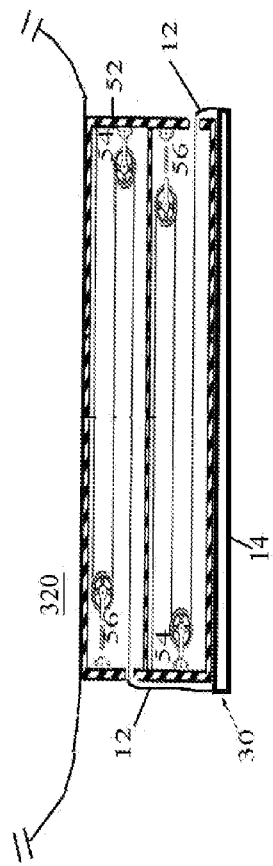
FIG. 14 is a cross-section illustrating a modification of the hard shell tablet case 300 of FIG. 13.

FIG. 14 is a cross-section illustrating a modification of the hard shell tablet case 300 with retractable cord system in which the dual-pulley retractor 30 mechanism is fixedly attached by housing 52 across anchor points P and P' on the bottom shell of hard shell tablet case 300, approximately 1" inward from its distal edge. Rather than attaching cords 12 to the case 300, the cords 12 are attached to a separate shoulder pad 14 (as disclosed above) which seats beneath the housing 52. This way, the shoulder pad 14 can be withdrawn/retracted via lines 12 smoothly away from or against the enclosure 52 again with precise setting of the retraction force necessary to dislodge shoulder pad 14. As the shoulder pad 14 is released by the user it returns to the position shown in FIG. 14 abutting the enclosure 52. Again the combined carry-handle 14/housing 52 doubles in purpose as a tilt stand to sit the hard shell tablet case 300 down on a desk or other surface at a proper typing angle.

Figure 16:
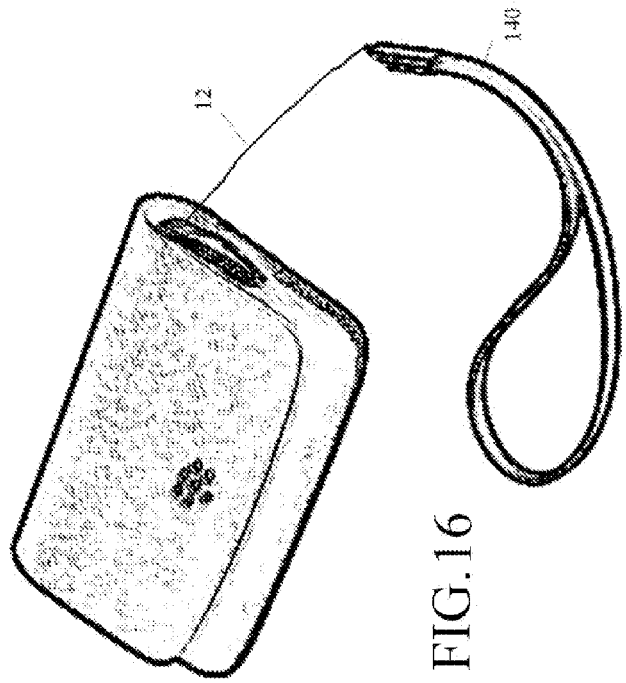
FIGS. 15-16 illustrate the use of a single retractor mechanism such as 20A or 220A on one side of an article to be carried to provide a retractable clutch-loop 140, rather than a shoulder cord.
Figure 15:
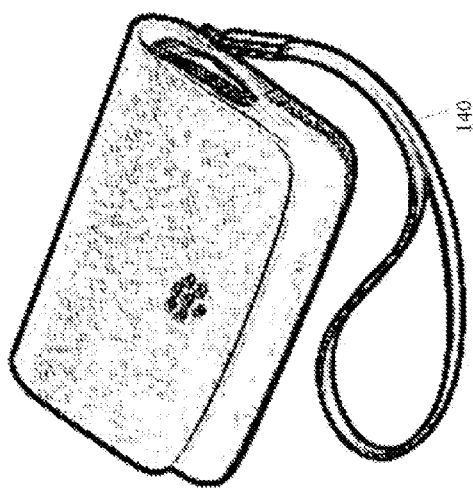

A single one of the foregoing retractor mechanisms can be used in a purse with retractable loop-cord as shown in FIGS. 15-16, simply by using only one retractor mechanism 20, 220A and replacing the shoulder cord 14 with a clutch-loop 140.

Figure 17:
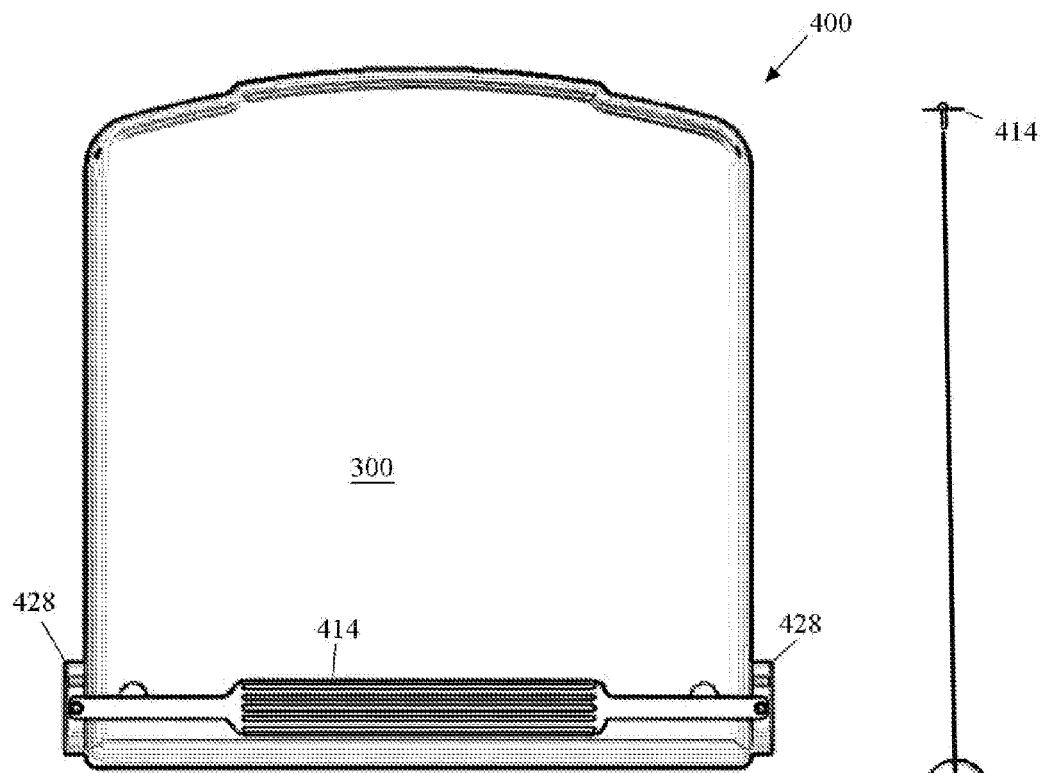
FIG. 17 is a perspective view of a hard shell tablet case 400 with retractable cord system according to another embodiment of the present invention.
Figure 18:
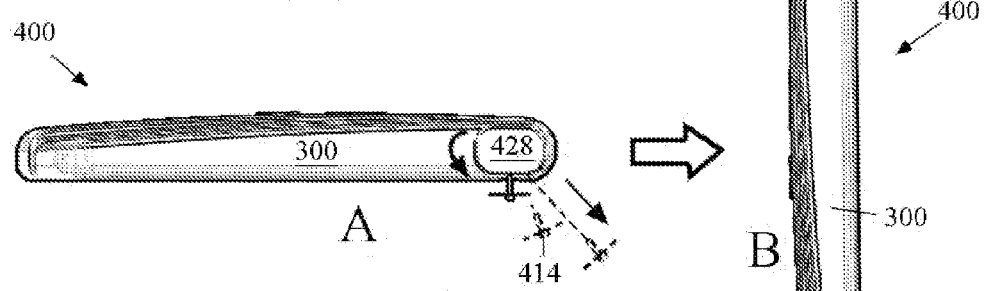
FIG. 18 is an operational diagram of the embodiment of FIG. 17.
Figure 19:
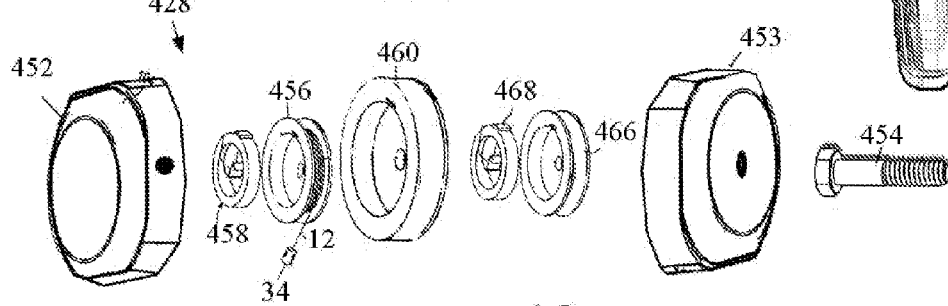
FIG. 19 is an exploded view of an exemplary retractor 433 mechanism as used in the embodiment of FIGS. 17-18.

FIGS. 17-19 illustrate a hard shell tablet case 400 with retractable cord system according to another embodiment of the present invention. As above this embodiment employs a hard shell tablet case 300 comprising a two-piece molded enclosure including a concave lower clam-shell portion hinged to a concave upper clam-shell portion at internal hinges, with internal tilt-mounting bracket and optional Bluetooth keyboard all as described above. Hard shell tablet case 400 employs a thin "low-profile" shoulder pad 414 formed of resilient plastic, in this embodiment being long enough to traverse the case 300. Two opposing spring-biased retractor mechanisms 428 are attached on opposing inside edges of the case 300. The retractor mechanisms 428 are of the spool type including housings containing spring-biased spools upon which are wound a length of braided microfiber line 12 (preferably braided UHMWPE filaments as above). The other end of each line 12 is attached to an end of shoulder pad 14 as shown. The retractor mechanisms 428 each have a spring bias calibrated within a range of from 40-49% of the weight of the article to be carried, here case 300 plus keyboard and tablet. The foregoing retractor mechanisms 428 differ in one salient respect. Not only does each contain a spring-biased spool for retracting line 12, but each is also mounted to a corner of case 300 via a spring-biased carousel for allowing angular rotation. In the illustrated embodiment this rotation is limited to 90 degrees from perpendicular to the case to parallel. However, one skilled in the art should understand that the limit on angular rotation may be changed as a matter of design choice. For example, if the article to be carried is a messenger bag and the retractor mechanisms 428 are located on the far side of the case away from the user, then the retractor mechanisms might rotate 120 degrees. The combined extraction/rotation has a distinct advantage. This seats the shoulder pad 14 to one side of case 300, but as handle is extracted the retractor mechanisms 428 rotate 90 degrees so that shoulder pad 14 is pulled parallel to the case 300. Consequently, as a user grabs shoulder pad 14 and drops case 300 it extracts smoothly and doesn't wobble or buck as it falls. As described further below, the spring-biased carousel urges each retractor mechanisms 428 into an angular "home" position in which line 12 exits retractor 428 through an aperture oriented down toward the bottom of case 300. However, as seen in the transitional diagram of FIG. 16, when the handle 414 is retracted the retraction force overcomes the spring-bias of the carousel and both of retractor mechanisms 428 rotate, changing their angular position 90 degrees to one in which line 12 exits retractor 428 through an aperture oriented directly toward the back of case 300. Thus, when suspended from the user's shoulder the line 12 runs directly downward into the retractor mechanisms 428 without fraying against an edge, yet when fully retracted the handle 414 resides flush against and traverses the case 300 approximately 1" inward across the bottom shell, where it is least intrusive.

FIG. 19 is an exploded illustration of an exemplary retractor mechanism 428, which further comprises a two-part housing formed of mating inner- and outer-sections 452, 453, respectively, and a spring-wound spool mechanism similar to that of FIGS. 3-4. The line 12 is spooled up through an aperture 440 in the outer section 452 and wound about a take-up reel 456 rotatably seated in the housing. The take-up reel 456 is spring-biased by a helically-wound spring 458 which may be seated inside reel 456. As above a line-stop 34 may be clamped to line 12 outside of housing 452 to limit retraction. Reel 456 is rotatably seated inside a separator 460 which partitions the housing. A spring-biased pivoting mechanism is mounted within the housing on the other side of separator 460, and this spring-biased pivoting mechanism allows for spring-biased angular rotation of the entire inner- and outer-sections 452, 453 with respect to the tablet case 300 from the home position. The spring-biased pivoting mechanism may comprise a carousel-washer 466 which seats the head of a bolt 454, the bolt 454 threading through inner housing section 453 and being anchored in case 300. A second helically-wound spring 468 is also seated in carousel-washer 466 and engaged between washer 466 and bolt 454. Thus, carousel-washer 466 serves as a pivot about which the entire retractor mechanism 428 can rotate, rotation preferably being limited to 90 degrees for the illustrated embodiment (more or less depending on the type of case), and spring-biased back by spring 468 to the home position pictured in FIG. 18.

Figure 20:
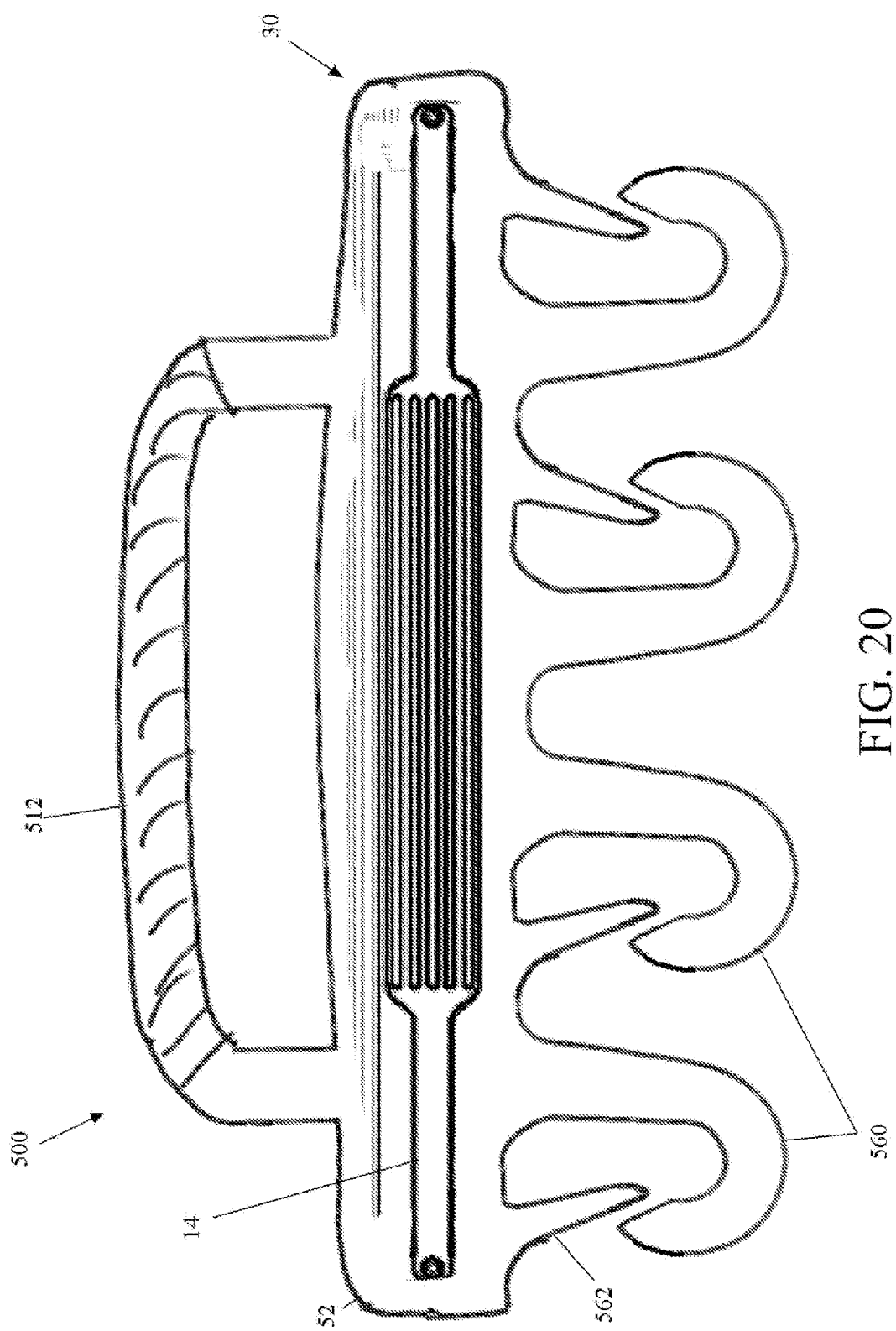
FIG. 20 is a front view of a shopping bag carrier with retractable cord system according to another embodiment of the present invention.

FIG. 20 is a front view of a shopping bag carrier 500 with retractable cord system according to another embodiment of the present invention. The shopping bag carrier 500 generally comprises a molded hand grip 512 joined to a housing 52 containing a dual-pulley retractor 30 mechanism and shoulder pad 14 according to the embodiment of FIG. 3. The shopping bag carrier 500 further includes a plurality of holding hooks 560 integrally-molded to housing 52 and extending downward therefrom. Preferably, four hooks 560 are provided, two oriented opposite the other two. A hook arm 562 extends from proximate the base of each hook 560 inwardly toward, but does not reach the distal tip of each hook 560. In the preferred embodiment, the handle 512, housing 52, hooks 560 and hook arms 562 all are formed from the same contiguous molded plastic material. This material should be strong but resilient, such that hook arms 562 flex slightly to allow the cords of grocery bags or shopping bags to be inserted onto hooks 560. Suitable materials include polypropylene, polyethylene, Nylon™, or other composites. The above-described shopping bag carrier 500 provides users with the ability to carry several (four) heavy shopping bags by hand via hand grip 512, and/or on their shoulder by retraction of shoulder pad 14. This bag carrying device 500 is far more convenient and comfortable to carry. It should now be apparent that the above-described invention provides more efficient and effective cord retraction/tightening system that pulls in line with the cord direction, is easy to adjust with one hand, achieves a mechanical advantage for secure tightening, and seats a shoulder pad flush inside a recess with no friction or tangling.

Those skilled in the art will understand that various modifications and variations can be made in the present invention without departing from the spirit or scope of the invention. It is to be understood, therefore, that the invention may be practiced otherwise than as specifically set forth in the appended claims.

What is claimed is:

1. A carry case for a portable electronic device, comprising
a clamshell enclosure including an upper flap portion hingedly connected to a lower flap portion along a spline; and
a retractor assembly including a first retractor mechanism and a second retractor mechanism;
a length of micro-fine line connected to both of said first and second retractor mechanisms, and
a handle suspended by said micro-fine line, said handle being retractable to a normally home position lying flush across and against said carry case, and an extended position for wear about a user's shoulder;
wherein said handle and said spline have magnetically-attractive elements embedded therein for securing said handle there against.

2. A carry case for a portable electronic device, comprising:
a clamshell enclosure including an upper flap portion hingedly connected to a lower flap portion along a spline; and
a retractor assembly including an elongate housing having a hole at each end, a first retractor mechanism and a second retractor mechanism both secured inside said housing each at a respective end, said housing being secured inside said clamshell enclosure and extending along said spline;
ultra-high-molecular-weight round braided micro-fine line of at least 100 pound test strength connected to both of said first and second retractor mechanisms, exiting said retractor housing through said holes and extending exteriorly around the spline of said clamshell enclosure, and
a handle suspended by said micro-fine line, said handle being retractable to a normally home position lying flush across and against said carry case, and an extended position for wear about a user's shoulder.

3. The carry case according to claim 2, wherein said first retractor mechanism is housed on one side of said elongate housing comprises a first pair of pulleys attached at opposing ends of said housing, and said second retractor mechanism is housed on another side of said housing comprises a second pair of pulleys attached at opposing ends of said housing.

4. The carry case according to claim 2, wherein the clamshell enclosure includes a recess in one of said upper flap portion, lower flap portion or spline, and said handle seats flush within said recess.

5. A carry case for a portable electronic device to be carried, comprising:
an enclosure for said portable electronic device to be carried, said enclosure having two ends and a spline extending between said two ends;
an elongate retractor housing attached inside said enclosure and extending end-to-end along said spline; and
a first retractor assembly contained within said retractor housing and including a first pulley attached at one end of said housing and a second pulley attached via a first extension spring to another end of said housing;
a second retractor assembly contained within said retractor housing and including a third pulley attached at one end of said housing and a fourth pulley attached via a second extension spring to another end of said housing;
a length of micro-fine line connected at one end to said first retractor mechanism and at another end to said second retractor mechanism, and
a handle attached to said micro-fine line, said handle being retractable to a normally home position lying flush against said enclosure, and extended position.

6. The carry case according to claim 5, wherein said enclosure for said article to be carried comprises a clamshell enclosure for a tablet computing device having an upper flap portion hingedly connected to a lower flap portion along said spline, and a frame for said tablet computing device hingedly attached medially to one of said flaps.

7. The carry case according to claim 6, further comprising a pair of opposing magnetic members, one of said magnetic member being affixed interiorly of the one of said flaps to which said frame is attached and the other of said pair of magnetic members being attached to a backside of said frame.

8. The carry case according to claim 6, further comprising a keyboard hingedly connected to the other of said flaps for folding out.

9. The carry case according to claim 6, wherein said keyboard is a Bluetooth keyboard.

10. The carry case according to claim 6, wherein said keyboard is hingedly connected along an edge to said other flap to thereby remain stowed fully upside down inside the carry case when in a first position but folded out rightside up to a second position for use.

11. The carry case according to claim 10, wherein when said keyboard is folded out rightside up to said second position for use it also provides a leaning stop for said tablet computing device.

* * * * *